Patented Nov. 4, 1947

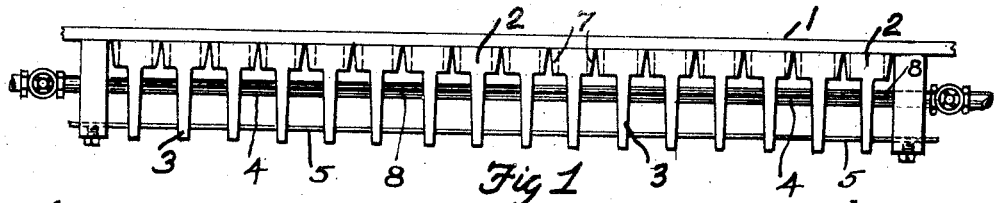
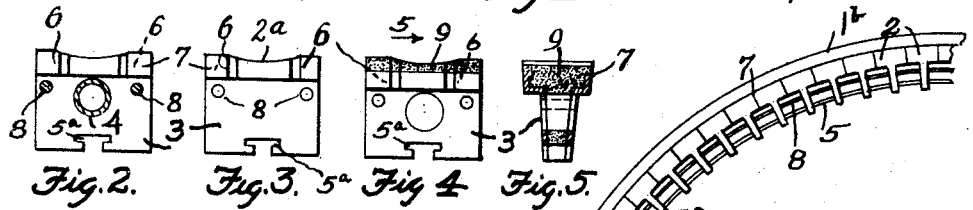
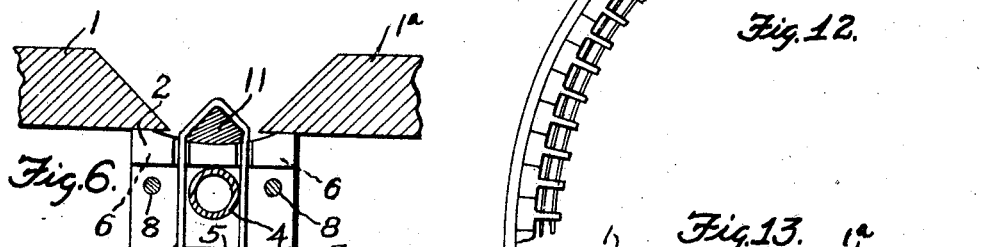
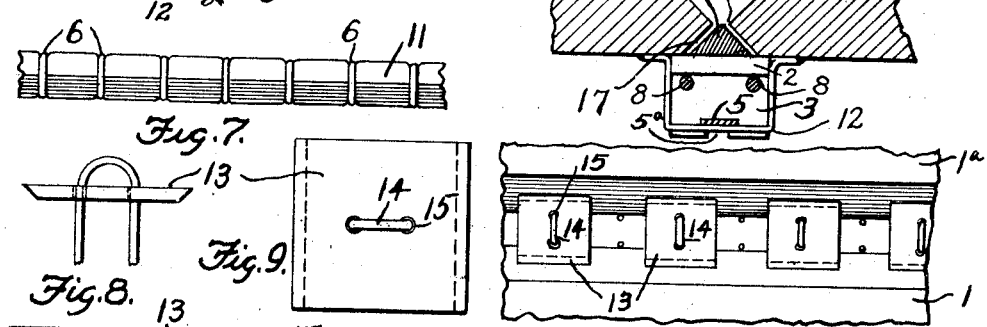
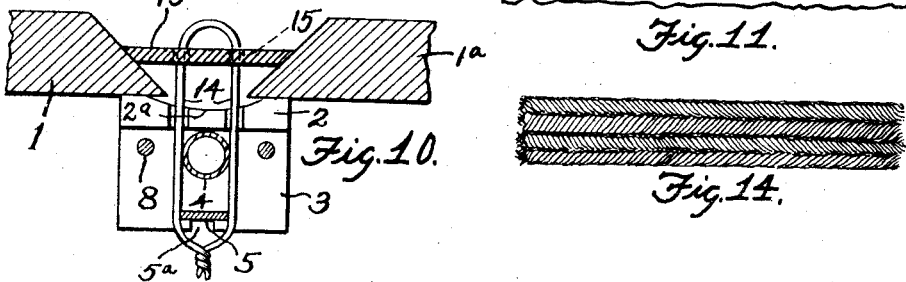
Robert F. Zimmerman, INVENTOR.

2,430,266

UNITED STATES PATENT OFFICE 2,430,266

BACKING-UP ELEMENT FOR WELDING

Robert F. Zimmerman, Cincinnati, Ohio, assignor to Lathrop-Hoge Construction Co., Cincinnati, Ohio, a partnership Application December 20, 1943, Serial No. 514,957

5 Claims. (Cl. 113—111)

My invention relates to elements for the backing up of welds, more particularly of long welds as between plates, whether flat or curved. There is a familiar practice in forming of welds which consists in the use of a chill strip or backing-up strip which underlies the two parts which are to be united by a welded joint. This is the practice more particularly, in forming welded joints where the two plate or other elements to be welded are not quite butted against each other. The backing-up strip permits of building up the weld by serving as a dam and also as a conductor away of the heat used in welding.

So far as I am advised, the use of chill strips or backing-up strips has not been developed beyond crude technique, wherein the strips are held in place in a table on which the work is placed. There has been no attempt, so far as I am advised, to make a strip which can be applied to a tank, boiler or the like which has been erected and the plates tack welded into position ready for welding, or in any sense applied to a curved line of weld. A solid strip of metal such as copper could theoretically be bent to conform to a particular curve, and theoretically applied and held in some way by external bracing so as to back up a weld joint in an erected structure, but practically it would not be economical. For one reason, the heat of welding and the job of application of the strip and removal of it, would result in distortion such as to make it unavailable for further use.

According to my invention I supply a backing-up element for welds which can be of any length or in sections of any length, the said strip being formed of individual elements held together by flexible means, so that the metallic mass or the mass formed of heat resistant material will be large to withstand the heat and conduct away heat, and yet the strip can be re-used repeatedly and applied to curved surfaces, as well as flat ones. In addition, I supply means for mounting the strip in place by members which pass through the joint to be welded, thus permitting of drawing the backing-up element firmly into place as a dam behind the joint.

It is very desirable to supply water cooling to such a structure, which will be desirable particularly in very heavy work, more particularly when done by automatic machines.

At present, in the forming of welds in erected structures as distinguished from being formed on a flat table, there has been no practical way for preventing the development of inwardly projecting stalactites from the welded joint. This often requires the removal of the "icicles," as they are called, by grinding or chipping them away. By my invention this is avoided, without danger of under supplying of metal to the weld.

My novel structure contemplates the use of a piece of welding rod material as part of the device for holding the backing-up strip in place.

My invention is valuable for use not only in welding erected structures but also in welding plates which are laid out on a table, and suitably supported in proper position for forming the welded joints between the several sheets or plates. In such an operation chill strips have been used, but the use of the flexible strip together with easy means of holding it in place, solves many difficulties in prior practice in the use of chill strips.

For light work my invention would be applicable to woven copper wire bands of heavy enough construction to stay in place by interspaced ties passed through the not quite abutted joints in the parts to be welded. Ordinarily, however, and for most uses the heavier section, jointed backing-up elements will be the best construction.

The backing-up element can be made of units which are of solid refractory material, or of refractory material cast into metal holders.

In the appended drawings I have illustrated some practical applications of my invention, without intent to indicate that the special form employed is limiting as to the inventive concept, and in the claims that follow I will set forth what is considered to be the said inventive concept which the drawings and disclosure to follow will illustrate.

In the drawings,

Figure 1 is a side elevation showing one of my units applied to a flat welding operation. The mounting means has been omitted in this figure.

Figure 2 is a front elevation of one of the blocks used in making up the backing-up units shown in Figure 1.

Figure 3 is a like view but omitting the water cooling tube.

Figure 4 is a like view showing a metal shell in which is a cast block of ceramic material.

Figure 5 is a vertical section taken through Figure 4.

Figure 6 is an enlarged view showing two plates to be welded, and one of the blocks in elevation illustrating one mode of mounting the backing-up unit in place.

Figure 7 is a plan view showing a piece of welding rod with lateral grooves, as employed in the structure of Figure 6.

Figure 8 is a side elevation illustrating an alternative mounting device.

Figure 9 is a top plan view thereof.

Figure 10 is a section like Figure 6 showing the use of the mounting device of Figures 8 and 9.

Figure 11 is a top plan view of the arrangement of Figure 10.

Figure 12 is an elevation showing the application of one of my units to a curved weld joint. Here again, as in Figure 1, the mounting devices are omitted.

Figure 13 is a view of a modification adapted for use in welding where a front and back welded seam is formed.

Figure 14 illustrates a piece of woven copper wire stripping which could be employed in light work.

In my application Serial No. 510,585 filed November 17, 1943, I have shown flexible structures applicable as backing-up means, more particularly wherein the backing-up strips or forms are made of expendable or fusible material, and are faced with refractory material. In the present application the use of structure which functions to conduct away heat more efficiently, and which is adapted for heavy welding operations, and which is removable and re-usable, is dealt with.

Referring first to Figure 1, there is shown the edge of a plate 1 to which the backing-up strip is applied, and the backing-up strip made of copper bars having heads 2 and fin-like bodies 3. Such an arrangement of the metal will serve as a better conductor of heat than solid bars. The copper will withstand the heat of welding and not contaminate the metal of the weld. Passing through the bars which have holes formed in the fin portions 3, may be a copper tube 4, which is supplied with cooling liquid. Passing through grooves in the bottom of the fins is a strip of metal, preferably of spring steel 5, which ties the bars together. In Figure 1, as already noted, the mounted devices are not shown.

Figures 2 and 3 show the copper bars in front elevation. The form in Figure 2 shows the use of the water cooling tube. As shown in this view, the heads 2 are grooved laterally with half round grooves 6 so as to permit fastening wires to extend through the face of the strip formed by the heads. The heads are formed with slanting abutting faces 7 so as to permit of curving the entire strip when assembled without leaving gaps between the heads.

In Figure 3 the copper tube for water cooling is omitted. In both Figures 2 and 3 there are holes 8 formed in the upper ends of the fin portions 3, through which wires are passed in order to assemble and hold the bars together. It is contemplated that either stringing on wires, or holding by means of the spring may be used to retain the bars in assembly, or both may be used, as illustrated. For mounting the spring strips 5 the lower ends of the fin portions are formed with T-slots 5a.

Figure 4 shows a metal shell having a head portion 9 in which is cast a ceramic, refractory substance as at 10 to complete the head. The shell is also filled with the refractory material. Figure 5 shows the same parts in section. Other than in its composite structure the bars of Figures 4 and 5 are alike to those of Figure 2.

Figure 6 shows one way of mounting the backing-up strip. In this figure, 1 and 1a illustrate two plates to be welded together by a butt weld. As in practice, they are spaced somewhat from each other, and laid into the bottom of the groove formed by the chamfered faces of the two plates is a strip 11 of what may be welding rod material. Preferably this strip is provided with lateral grooves therein, best shown in the plan view thereof in Figure 7. One of the bars is shown backing up the joint between the two plates, and tie wire 12 is passed around the welding rod strip and thrust through the holes formed by means of the grooves 6 in the heads of the bars and the ends twisted together around the spring strip.

In mounting the device as shown in Figure 6, the preferred practice will be to secure the triangular strip of welding rod in place on the flexible backing-up strip by means of the wire ties. With the plates set up for making the weld the combined structure is pressed against the back of the space in which the seam is to be formed. This will thrust the welding rod strip in through the space and the welder will be able with tack weld operations to rapidly tack the welding rod strip in place. In Figure 12 I have not illustrated the mode of mounting the backing-up strip in place because of scale limitations. I show a curved plate portion 1b and the backing-up strip bent to position of application snugly to the rear of the seam defined by the edge of the curved plate that is shown.

Of course it would be feasible to make the welding rod strip larger than the space between plates to be welded together and during the mounting operation to slip the wire ties in place and wire the backing-up strip into position by means of the wires without any tacking. In any event, whatever lies within the seam space will be melted down and form part of the weld, and the removal of the backing-up strip can be quickly accomplished by merely snipping the wire ties, and striking them off at the roots where they project through the back of the welded joint.

In Figures 8, 9 and 10 I show another form of mounting. In this case metal plates of suitable composition to fuse with the welding metal are used as at 13. Through these the tie wire 14 is inserted in suitable holes 15, and the backing-up strip fastened in place by means of the wire ends, as in the first instance. The spacing of the plates in this instance, or the spacing of the ties in the first instance will depend upon the requirements of the particular job. The point is to bring the backing-up strip firmly home to serve as a dam for the weld.

As shown in the various figures, it will probably be desirable to form grooves 2a in the heads of the bars so that some of the metal from the weld can underlie the finished weld and reinforce it. This is in accordance with known practice in chill strips.

In Figure 13 I have shown a somewhat different form of device in which the element has a head 2 and tail 3, as in the other forms, but the triangular portion of suitable welding rod material as at 11a is inserted in a groove formed in the plates to be welded as in the practice of forming an inner as well as an outer seam. The plates 1 and 1a have grooves 16 and 17, and the piece of welding rod material fits the back groove 17. In this form the mounting through the space of the welded seam is not so practical and the wire ties 18 are bent outwardly and then tacked in place by welding, when the flexible strip is applied.

It should be noted that the particular shape of the elements, herein referred to as bars, is not of the essence of the invention, although it is desirable to have the heads so conformed that the result of curving the assembled strip will not be the formation of gaps between the heads. Also it is not a necessity that the bodies of the bars be shaped as heat dissipating fins, nor to employ the cooling tube with the device. The bars can be made of other than copper, and, as an example, might be of carbon, or refractory material.

The wire ties are shown as a simple way of holding the backing-up strip by means of elements which pass through the joint to be welded. Other such means could be supplied in the form of special clips or the like, without departing from the essential idea.

In some cases where light work is to be done, it will be practical to use a heavy woven metal wire strip, which I have indicated in the view in Figure 14. This will partake of the nature of my invention in its broader aspects because it will be flexible enough to conform to joints of various shapes, and can be tied in place by wires punched through it at intervals and the strip mounted as is shown in Figure 10. The life of such a strip under the circumstances of anything but careful welding would not be long. It is thus not preferred.

Having thus described my invention, what I claim as new and desire to secure by Letters Patent is:

1. A backing-up element for welding comprising a linear structure formed of discrete members strung on a flexible support in abutting relation, and means arranged to pass through the space between adjacent pieces to be welded for mounting the linear structure so as to back up the said piece, said means comprising an element lodged in the groove between the pieces to be welded and having means thereon to detachably engage the linear structure.

2. A backing-up element for welding comprising a linear structure formed of discrete members strung on a flexible support in abutting relation, and means arranged to pass through the space between adjacent pieces to be welded for mounting the linear structure so as to back up the said piece, said means comprising a strip of welding material lodged in the groove between the pieces to be welded and means engaged by said strip and passing through the said space to retain the linear structure in place.

3. A backing-up element for welding comprising a linear structure formed of discrete members strung on a flexible support in abutting relation, and means arranged to pass through the space between adjacent pieces to be welded for mounting the linear structure so as to back up the said piece, said means comprising interspaced blocks lodged in the groove between the pieces to be welded and means engaged by the blocks and passing through the said space to retain the linear structure in place.

4. A backing-up element for welding comprising a linear structure formed of discrete members strung on a flexible support, and a strip of welding rod material mounted thereon by means of ties, said strip being of a dimension to be thrust in between the spaced members of plates to be joined together by welding, so that it can be tack welded in the seam space, thus holding the element in position for backing up a weld.

5. A backing-up element for welding comprising a linear structure formed of discrete members having heads terminating in fins, a flexible means engaging the fins for securing the heads in abutting relation, and means for holding the members in position with their long axes normal to the surface against which the heads are caused to engage.

ROBERT F. ZIMMERMAN.

REFERENCES CITED

The following references are of record in the file of this patent:

UNITED STATES PATENTS

| Number | Name | Date |
| --- | --- | --- |
| 2,365,226 | Stout | Dec. 19, 1944 |
| 2,010,155 | Hull | Aug. 6, 1935 |
| 1,449,369 | Anderson | Mar. 27, 1923 |
| 1,995,546 | Meier | Mar. 26, 1935 |
| 1,884,144 | Norquist | Oct. 25, 1932 |
| 2,317,734 | Cook | Apr. 27, 1943 |
| 2,321,308 | Miller | June 8, 1943 |
| 1,806,954 | Schmitz | May 26, 1931 |
| 1,710,258 | Hume | Apr. 23, 1929 |